(12) United States Patent
Ylitalo

(10) Patent No.: US 7,069,052 B2
(45) Date of Patent: Jun. 27, 2006

(54) DATA TRANSMISSION METHOD IN BASE STATION OF RADIO SYSTEM, BASE STATION OF RADIO SYSTEM, AND ANTENNA ARRAY OF BASE STATION

(75) Inventor: Juha Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 297 days.

(21) Appl. No.: 10/286,979

(22) Filed: Nov. 4, 2002

(65) Prior Publication Data
US 2004/0087281 A1 May 6, 2004

(51) Int. Cl.
*H04B 1/38* (2006.01)

(52) U.S. Cl. .................. 455/562.1; 455/101; 455/561; 375/267; 375/299

(58) Field of Classification Search ............... 455/101, 455/456.5, 456.6, 575.7, 561, 562.1, 422.1, 455/425, 424, 13.3, 19, 25, 507, 506, 63.4, 455/65, 67.13, 82, 83, 129, 269, 272, 270, 455/271, 277.1, 277.2, 121, 279.1, 276.1, 455/274, 575.1, 550.1, 517, 509, 103, 278.1; 343/892, 700 MS, 893, 725, 853, 844, 872, 343/890, 797, 700, 803, 816, 817–819, 368, 343/810, 354, 813, 846, 848, 795, 702, 821; 342/373, 361, 362, 368, 372, 374; 375/267, 375/299, 298, 146, 285; 370/343, 208, 347, 370/346, 204, 209, 210
See application file for complete search history.

(56) References Cited

U.S. PATENT DOCUMENTS 5,778,324 A * 7/1998 Smith ....................... 455/562.1
6,034,649 A * 3/2000 Wilson et al. ............... 343/795
6,211,841 B1 * 4/2001 Smith et al. ................. 343/813
6,232,921 B1 * 5/2001 Aiken et al. ................. 342/383
6,765,529 B1 * 7/2004 Doi et al. ..................... 342/368
6,801,790 B1 * 10/2004 Rudrapatna ............... 455/562.1
2002/0021246 A1 * 2/2002 Martek et al. ............... 342/373
2004/0108956 A1 * 6/2004 Gottl et al. .......... 343/700 MS

FOREIGN PATENT DOCUMENTS

EP          0 755 090 A1    1/1997
WO       WO 01/78254 A1   10/2001
WO       WO 01/89030 A1   11/2001

OTHER PUBLICATIONS

Tiirola et al, "Comparison of Beamforming and Diversity Approaches for the Coverage Extension of WCDMA Macro Cells," VTC Fall 2001. IEEE 54th Vehicular Technology Conference. Proceedings, vol. 1 of 4. Conf. 54, Oct. 7, 2001, pp. 1274-1278, XP010562166.

* cited by examiner

*Primary Examiner*—Edward F. Urban
*Assistant Examiner*—Charles Chow
(74) *Attorney, Agent, or Firm*—Squire, Sanders & Dempsey LLP

(57) ABSTRACT

The invention relates to a method and a base station of a radio system implementing the method and to an antenna array of the base station which enable both antenna diversity and beam forming using the same antenna array. In the solution described the antenna array comprises, in addition to a linear part configured for beam forming, a non-linear part which is used for forming diversity. Furthermore, the non-linear part enlarges the aperture of the antenna array, thus improving the quality of beam forming.

15 Claims, 5 Drawing Sheets

Figure 1:
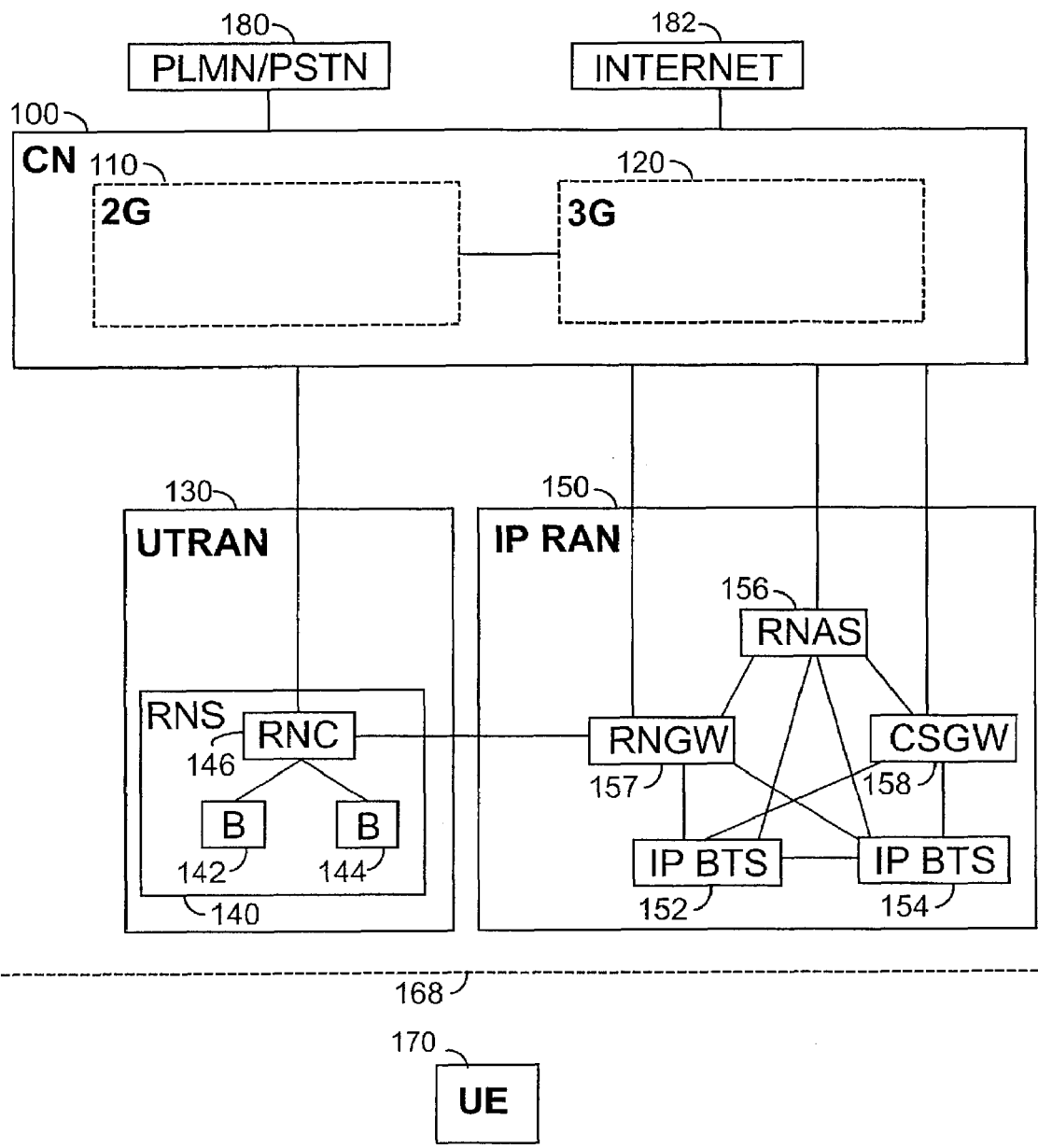

DATA TRANSMISSION METHOD IN BASE STATION OF RADIO SYSTEM, BASE STATION OF RADIO SYSTEM, AND ANTENNA ARRAY OF BASE STATION

FIELD

The invention relates to a data transmission method in a base station of a radio system, a base station of the radio system, and an antenna array of the base station.

BACKGROUND

As wireless data transmission becomes more common and the need for capacity increases, the changing capacity requirements can be met by enhancing the use of the existing infrastructure of telecommunications systems. One way of increasing the capacity of a wireless telecommunications system is to utilize data transmission modes in the data transmission between a base station and a user terminal that are more advanced than the existing data transmission modes.

One way of enhancing the capacity of a wireless telecommunications system is to utilize various diversity modes, such as time diversity and antenna diversity, in data transmission between a base station and a user terminal. In the case of antenna diversity, the radio interface is implemented so that the same signal is received and/or transmitted using antenna elements which have different locations and polarizations. This way the probability increases that at least one antenna element is located in an advantageous place in respect of the signal path. Use of antenna diversity requires an antenna solution where the distance between antenna elements is sufficiently long so that one can keep the interference between the electromagnetic waves related to the antenna elements low and provide a large number of alternative signal paths between the base station and the user terminal. A base station utilizing antenna diversity functions in 'antenna diversity mode'.

Another way of increasing the capacity of a wireless telecommunications system is to use beam forming. In beam forming, the signal power of a base station can be directed to the areas that need capacity. In addition, a signal directed to different areas can be encoded in a beam-specific manner. Beam forming requires an antenna solution where the distance between antenna elements is sufficiently short to enable unequivocal beam forming and to avoid grating lobes. A base station utilizing beam forming functions in 'beamforming mode'.

In a prior art solution the antenna arrays of a base station allow the base station to function either in antenna diversity mode or in beam-forming mode.

A problem associated with the prior art solution is that the base station is unable to support simultaneously both the antenna diversity mode and the beam-forming mode. Switching of the data transmission mode between the above-mentioned modes requires modification of the whole antenna arrangement or replacement of the whole old antenna arrangement with a new one. This results in significant disadvantages to the operation of the radio system.

BRIEF DESCRIPTION

The object of the invention is to provide a method and a base station of a radio system implementing the method so that the same base station can be used both in antenna diversity mode and in beam-forming mode. This is achieved by a data transmission method in a base station of a radio system, the method comprising performing the following steps in the same base station: forming an antenna diversity mode using at least one antenna element of a linear part of a compact antenna array and at least one antenna element of a non-linear part; and forming a beam-forming mode using at least one antenna element of the linear part of the compact antenna array used in the formation of the antenna diversity mode and another antenna element of the linear part.

The invention also relates to a base station of a radio system comprising: a compact antenna array for implementing a radio interface of the base station; the compact antenna array including a linear part and a nonlinear part; the linear part including at least two antenna elements for transmitting and receiving signals; the non-linear part including at least one antenna element for transmitting and receiving signals; weighting means for weighting signals of the antenna elements; the linear part, non-linear part and weighting means being arranged to form a beam-forming mode of the base station; and the linear part, non-linear part and weighting means being further arranged to form a diversity mode of the base station.

The invention further relates to a compact antenna array for implementing a radio interface of a base station comprising: a linear part and a non-linear part; the linear part including at least two antenna elements for transmitting and receiving signals; the non-linear part including at least one antenna element for transmitting and receiving signals; the linear part being arranged to form a beam radiation pattern; and the non-linear part being arranged to form at least one component of a diversity radiation pattern.

The preferred embodiments of the invention are described in the independent claims.

The invention is based on the idea that, thanks to the non-linear part of the antenna array, the base station can function both in antenna diversity mode and in beam-forming mode using the same antenna array. Furthermore, the invention enables the use of all elements of an antenna array, if necessary, both for transmitting and receiving a signal both in antenna diversity mode and in beam-forming mode.

The method and base station of the invention provide several advantages. One feature is that the same antenna array is suitable both for antenna diversity and for beam forming. In that case, a transition to beam forming, for example, can occur without changing or adding antenna components. Another feature is that the non-linear part of the antenna array enlarges the aperture of the antenna array, which results in a more effective allocation of a radio signal in a base station cell.

LIST OF FIGURES

Figure 2:
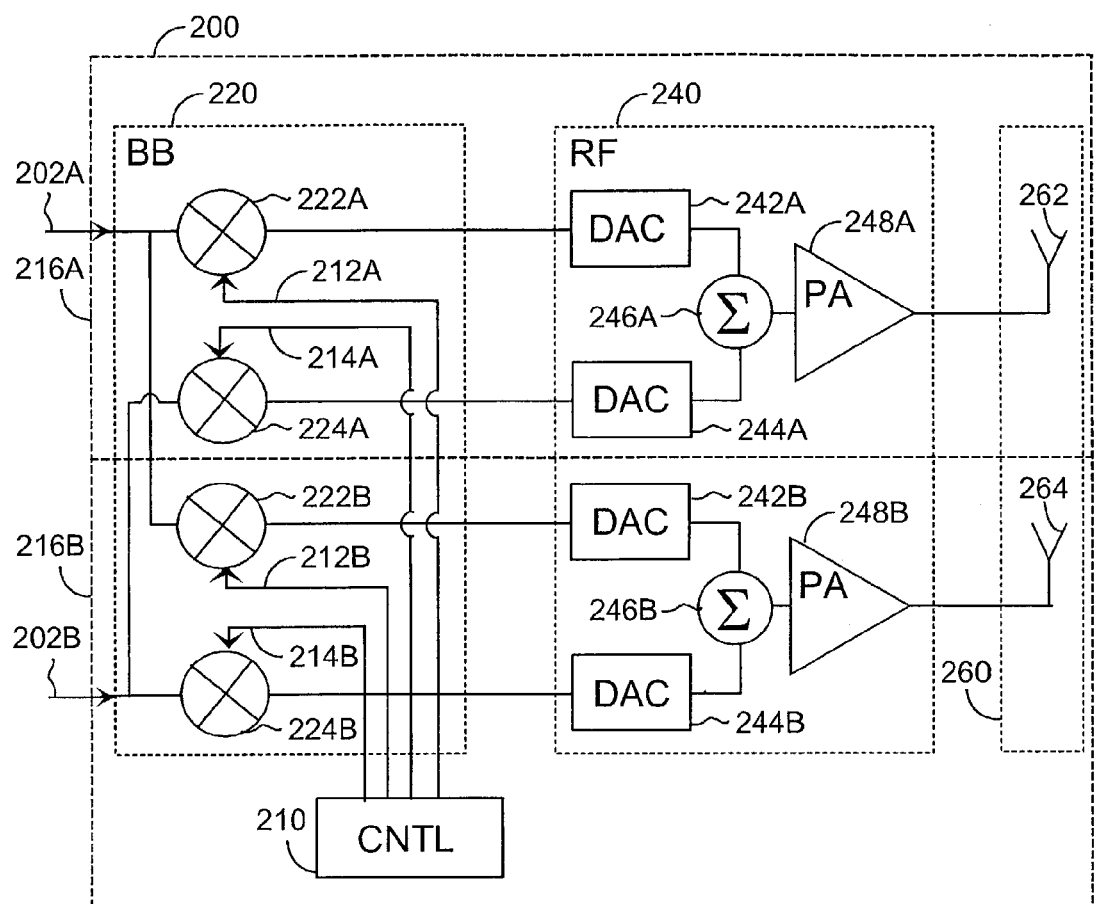
Figure 3:
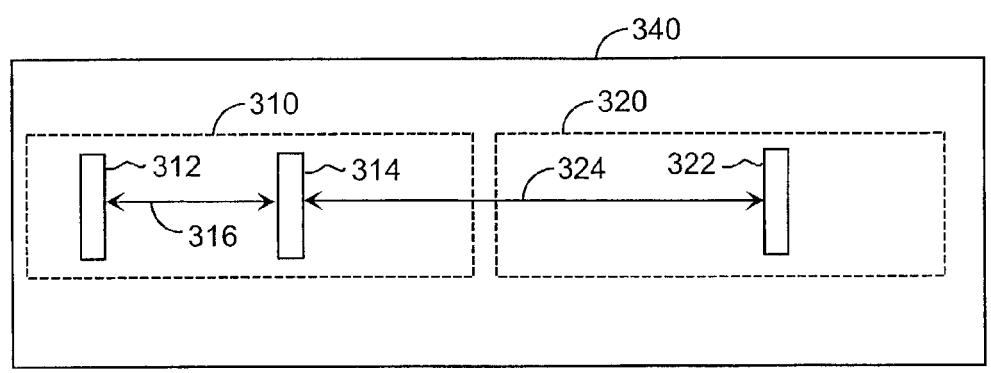
Figure 4:
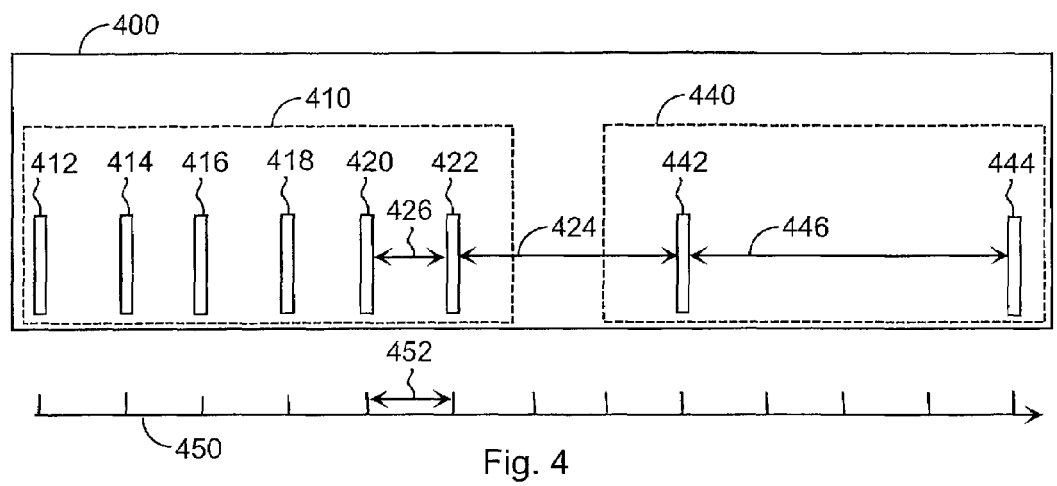
Figure 5:
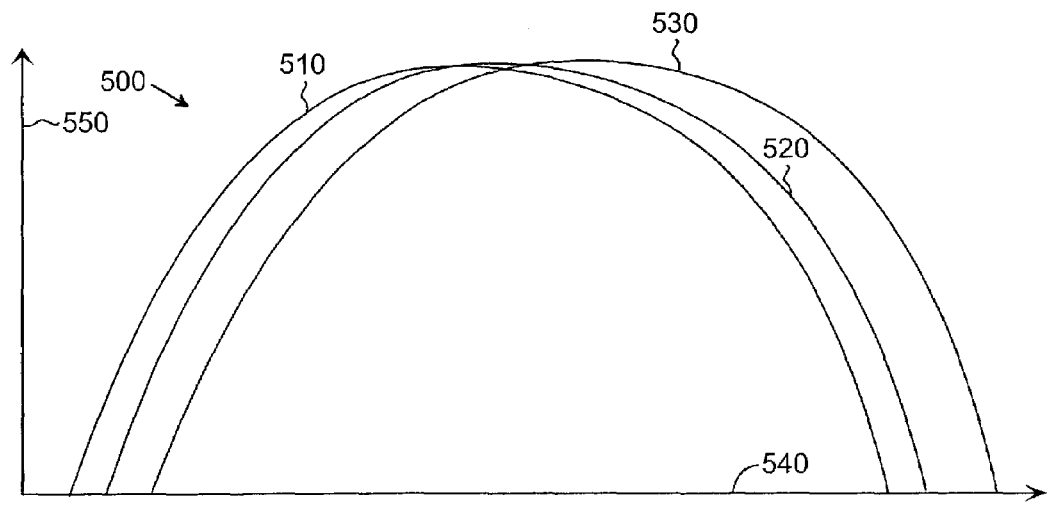
Figure 6:
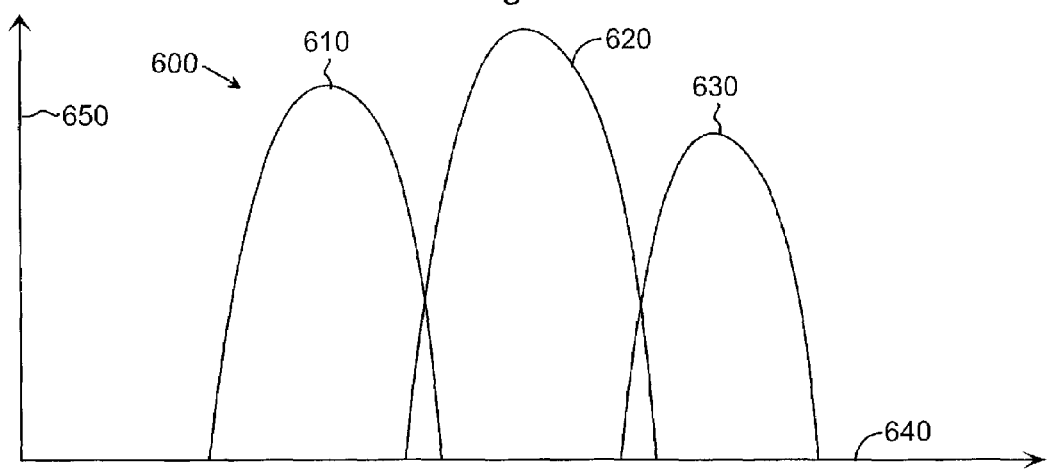
Figure 7:
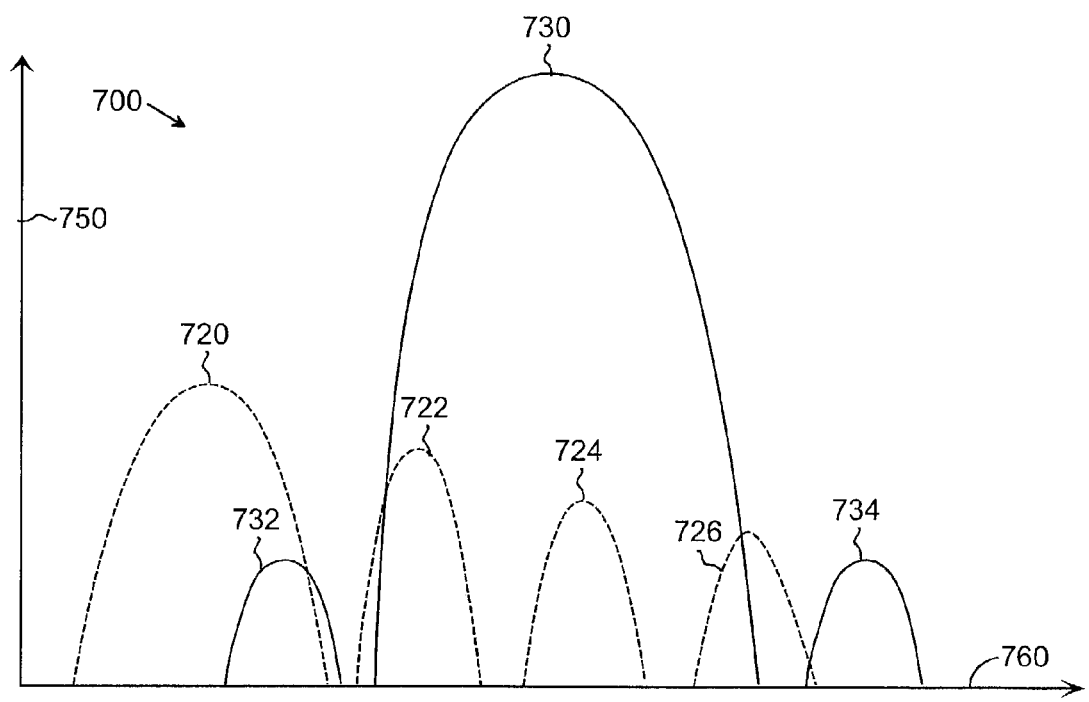
Figure 8:
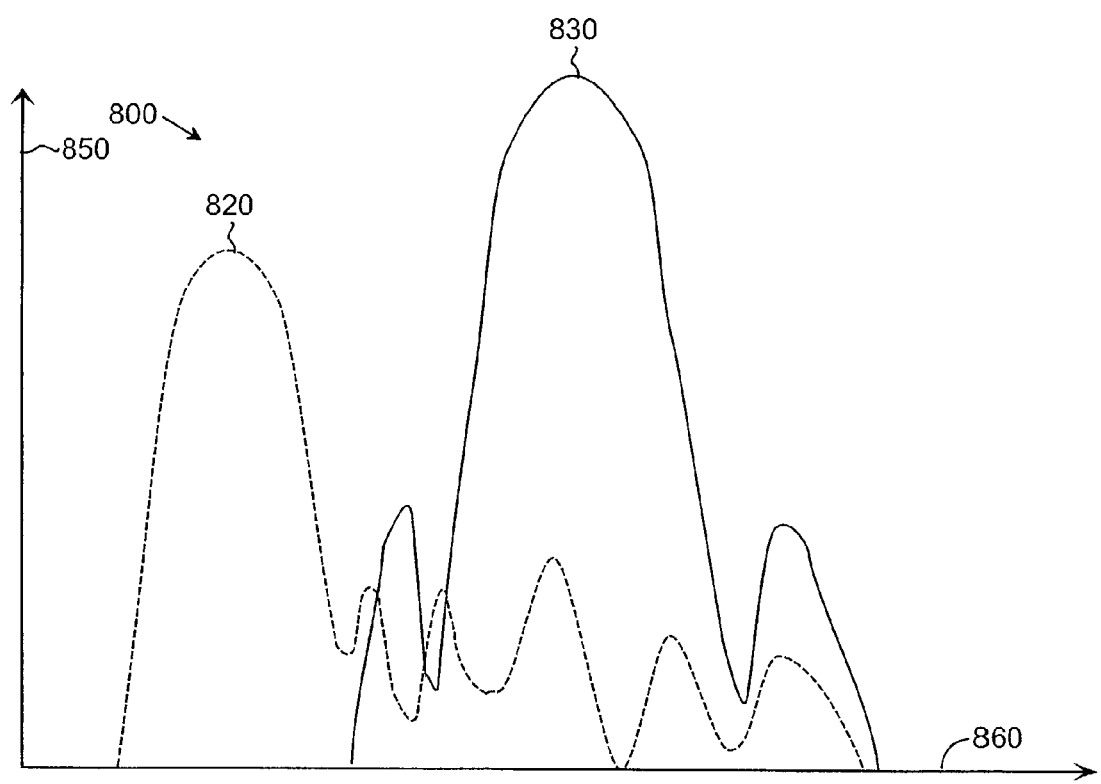
Figure 9:
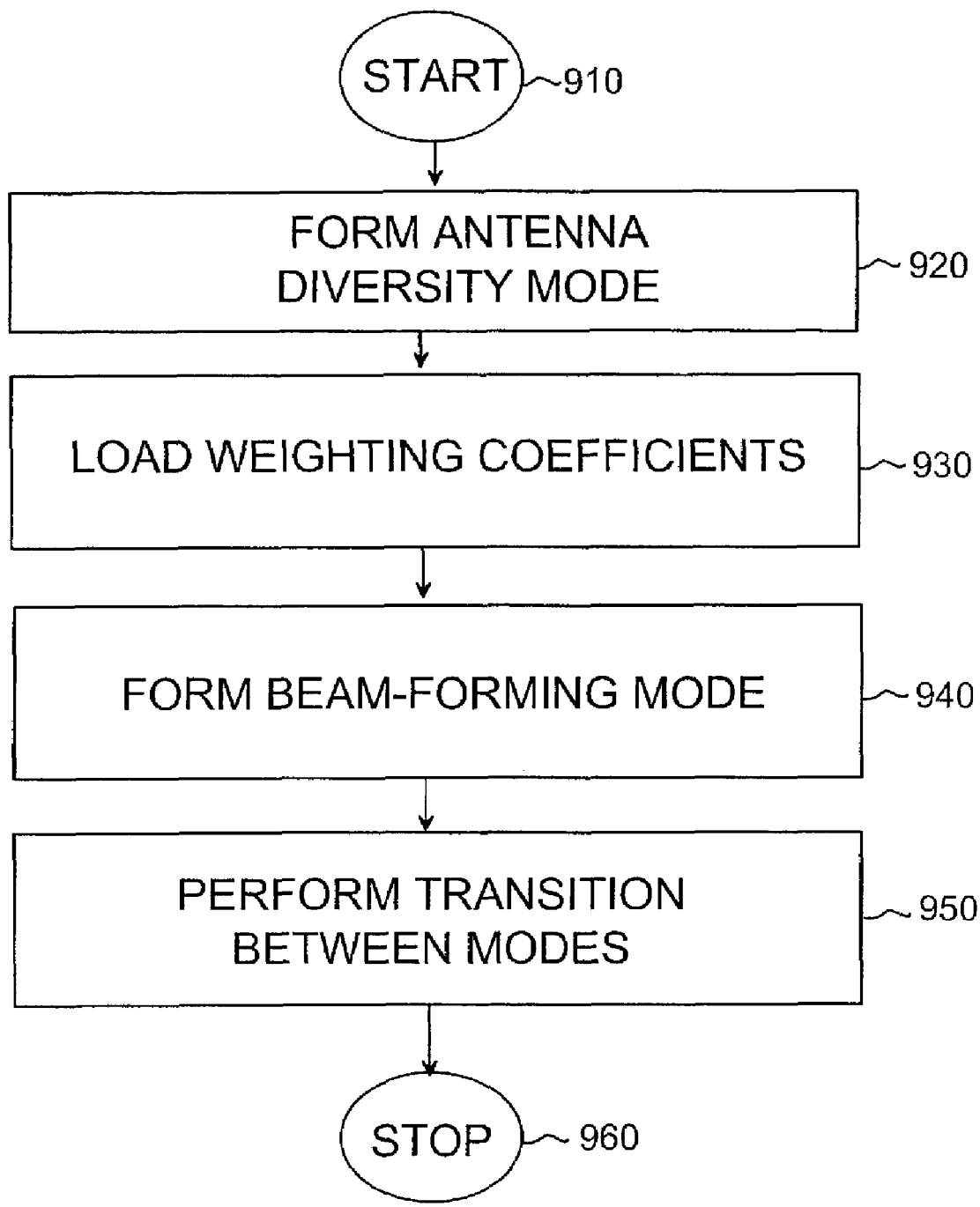

The invention will now be described in greater detail by means of preferred embodiments with reference to the accompanying drawings, in which FIG. 1 illustrates an example of the structure of a telecommunications system, FIG. 2 illustrates an example of the structure of a base station transceiver, FIG. 3 illustrates an example of the antenna structure according to the present solution, FIG. 4 illustrates a second example of the antenna structure according to the present solution, FIG. 5 illustrates an example of a diversity radiation pattern, FIG. 6 illustrates an example of a beam radiation pattern, FIG. 7 illustrates a second example of a beam radiation pattern, FIG. 8 illustrates a third example of a beam radiation pattern, and FIG. 9 illustrates a flow chart of the method.

DESCRIPTION OF EMBODIMENTS

An example of a telecommunications system where the embodiments described can be applied will be discussed with reference to FIG. 1. FIG. 1 illustrates the structure of a telecommunications system in a simplified manner on the level of network elements. The structure and functions of network elements are illustrated rather cursorily because they are generally known.

The telecommunications system can be divided into a network part and user equipment 170. The telecommunications system may also be connected to external networks 180, such as a public land mobile network (PLMN) or a public switched telephone network (PSTN). The network part may further be connected to packet switched networks, such as the Internet 182.

The network part comprises the fixed infrastructure of the radio system, i.e. a core network CN 100, a UMTS (Universal Mobile Telecommunications System) terrestrial radio access network (UTRAN) 130 and an internet protocol radio access network (IP RAN) 150. The radio access network 130 and the IP access network 150 are implemented by the WCDMA technique (WCDMA; Wide-band Code Division Multiple Access).

The user equipment 170 constitutes the mobile infrastructure of the radio system and it is also known as a terminal, a subscriber terminal and a mobile phone, for example.

The core network 100 comprises elements 110, 120 of the second and third mobile generations. These will not, however, be described in greater detail.

The radio access network 130 consists of radio network subsystems RNS 140. Each radio network subsystem 140 consists of radio network controllers RNC 146 and B nodes 142, 144. The B node is often referred to as a base station.

The radio network controller 146 controls the B nodes 142, 144 belonging to it. The radio network controller 146 is responsible for the following tasks, for instance: radio resource management of the B node 142, 144, intercell handovers, frequency management, i.e. allocation of frequencies to the B nodes 142, 144, management of frequency hopping sequences, measurement of time delays on the uplink, implementation of the operation and maintenance interface, and power control. Furthermore, antenna weights to be used in beam forming can be defined in the radio network controller 146.

The B node 142, 144 includes at least one transceiver for implementing the WCDMA radio interface. The tasks of the B node 142, 144 include: calculation of timing advance (TA), uplink measurements, channel coding, encryption, decryption, and frequency hopping.

The IP (Internet protocol) radio access network 150 comprises a radio access network server RNAS 156, a radio network gateway RNGW 157, a circuit switched gateway CSGW 158 and Internet protocol base transceiver stations IP BTS 152, 154. In the IP radio access network 150, data transmission between the network elements and the IP base stations 152, 154 is based on Internet protocols.

The radio access network server 156 functions as a signaling gateway between the IP radio access network 150 and the core network 100.

The circuit switched gateway 158 is a user-level element controlled by the radio access network server 156. It is employed in the operation between the IP radio access network 150 and the circuit switched network elements of the core network 100.

Controlled by the radio access network server 156, the radio network gateway 157 forms a user level from the IP radio access network 150 to the core network 100 or to other radio access networks 140.

The IP base station 152, 154 includes at least one transceiver for implementing the WCDMA interface. The IP base station 152, 154 is responsible for the following tasks, for example: calculation of timing advance (TA), uplink measurements, channel coding, encryption, decryption, and frequency hopping. Furthermore, the IP base station 152, 154 may comprise network elements which perform functions similar to those performed by the radio network controller 146 of the radio access network 130.

In this context, the B nodes 142, 144 and IP base stations 152, 154 are called base stations.

The user equipment 170 comprises at least one transceiver for implementing a radio interface 168 to the radio access network 130 or to the IP radio access network 150.

FIG. 2 illustrates an example of the structure of a transceiver 200 of the base station 142, 144, 152, 154 in principle. For the sake of simplicity, FIG. 2 illustrates only the transmission sequence of signals, from which a person skilled in the art can easily construe a receiver sequence. The transceiver 200 comprises a control unit 210, a base band block 220, a radio frequency block 240 and an antenna array 260.

The base band (BB) block comprises complex multipliers 222A, 224A, 222B, 224B with which the signals 202A, 202B of the base band block can be weighted digitally according to the weights 212A, 214A, 212B, 214B received from the control unit 210, for example. The complex multipliers 222A, 224A, 222A, 224B can be implemented in the signal processor of the base band block 220, by separate ASIC circuits (Application-Specific Integrated Circuit) or by separate modulator components.

The radio frequency (RF) block RF is deemed to comprise digital/analog converters 242A, 244A, 242B, 244B for converting the signals formed by the base band block 220 into analogue form. FIG. 2 also shows power amplifiers 248A, 248B for amplifying signals to be fed to antenna elements 262, 264. The radio frequency block 240 further includes frequency converters for upconverting base band signals to the radio frequency, and radio frequency filters, but these are not shown in FIG. 2.

Referring to the example shown in FIG. 2, the functional entity formed by the base band block 220, radio frequency block 240 and antenna array 246 can be divided into antenna branches 216A, 216B. Each antenna branch 216A, 216B comprises at least one antenna element 262, 264 of the antenna array 260 and possibly analogue/digital converters 242A, 244A, 242B, 244B, adders 246A, 246B and power amplifiers 248A, 248B. Each antenna branch 216A, 216B is responsible for processing signals of the antenna branch specific antenna element 262, 264, e.g. weighting, digital/analogue conversion, amplification and filtering. The concept of the present solution is applicable both to receiving antenna branches and to transmitting antenna branches.

Further, the function of one antenna branch 216A will be described with reference to FIG. 2. The signals 202A and 202B are supplied to the complex multipliers 222A, 224A of the antenna branch 216A and weighted digitally e.g. with weights 212A, 214A produced by the control unit 210 or the radio network controller 146, for instance. Weighting can be carried out in the base band block 220 of the base station 142, 144, 152, 154 e.g. by dividing the signals 202A, 202B into complex and real parts, which are supplied to I and Q branches, where the complex and real parts of the signals are weighted separately. This method is known as IQ multiplication. For the sake of clarity, FIG. 2 illustrates only one complex multiplier per each signal 202A, 202B. After weighting, the weighted signals 202A, 202B are supplied to digital/analogue converters 242A, 244A, where they are converted into analogue form. After this, the analogue signals are combined in the adder 246A, converted to the radio frequency in the radio frequency modulator and amplified in the power amplifier 248A. Alternatively, the signals can be combined in the digital parts. The amplified signal produced by the power amplifier 248A is supplied to the antenna element 262, which forms an electromagnetic component corresponding to weighting in the electromagnetic field formed by the antenna array 260.

The signals 202A, 202B can also be weighted by weighting the analogue signal, but this embodiment is not illustrated in FIG. 2. In that case, the complex multipliers 222A, 224A, 222B, 224B form a 'phase shift array' which can be controlled digitally. Each signal 202A, 202B to be weighted is supplied to the input of this array and a weighted signal is obtained from its output. Weighting can be carried out e.g. by changing amplification of the weighting amplifier by the weights 212A, 214A produced by the control unit 210. The complex multipliers 222A, 224A, 222B, 224B can also be placed after the power amplifiers 248A, 248B, in which case amplification weighting and amplitude weighting are achieved by using a purely analogue phase shift array. However, also in this case phasing can be controlled digitally. It is obvious to a person skilled in the art that complex weighting can also be carried out in intermediate frequency parts, which are not shown in FIG. 2 for the sake of clarity.

FIGS. 2, 5 and 6 illustrate mathematical presentation of signal weighting and radiation patterns to be formed by weighting. FIG. 5 shows an example of a space diversity radiation pattern 500, the horizontal axis 540 represents an azimuth angle determined from the antenna array 260 of the base station 142, 144, 152, 154, and the vertical axis 550 represents the signal power of the radiation pattern 500. Radiation patterns 510, 520 and 530 are different diversity components of the radiation pattern 500. FIG. 6 illustrates a beam radiation pattern 600, the horizontal axis 640 represents an azimuth angle determined from the antenna array 260 of the base station 142, 144, 152, 154, and the vertical axis 650 represents the signal power of the radiation pattern 600. Radiation patterns 610, 620 and 630 are main beams formed by the antenna array 260. The main beams 610, 620 and 620 may also have a partly different encoding: for example, beams 610, 620 and 630 may have the same channelization codes but different CDMA spreading codes.

Weighting of the signals 202A, 202B can be formulated mathematically by means of weighting coefficients, which are realized as the weights 212A, 214A, 212B, 214B illustrated in FIG. 2. Let M be the number of antennas 262, 264 in the antenna array 260 and $M \geq 2$, and let K be the number of diversity components 510, 520 and 530 formed by the antenna array 260 or the number of main beams 610, 620, 630. Signals to be supplied to different beams are denoted by components $x_1, \ldots, x_K$ of vector X and weighted signals to be supplied to different antennas 262, 264 by components $y_1, \ldots, y_M$ of vector Y. Thus $$X = (x_1, x_2, K, x_K)^T$$

$$Y = (y_1, y_2, K, y_M)^T$$

where index T means transposition of the vector or the matrix. The following matrix equation is valid for vectors X and Y $$Y = VX,$$

where matrix V is the weighting matrix including weighting coefficients for different antennas 262, 264. The weighting matrix V can be defined as follows:

$$V = \begin{pmatrix} W_{1,1} & W_{1,2} & \Lambda & W_{1,K} \\ W_{2,1} & W_{2,2} & \Lambda & W_{2,K} \\ M & M & O & M \\ W_{M,1} & W_{M,2} & \Lambda & W_{M,K} \end{pmatrix}$$

The weighting coefficients $W_{m,k}$ can be presented in a complex form $W_{m,k}(A_{m,k}, \phi_{m,k}) = A_{m,k} e^{i\phi_{m,k}}$ where $A_{m,k}$ is the amplitude weighting of antenna element m of the antenna array 260 and $\Phi_{m,k}$ is the phase factor of antenna element m. The index k refers to the main beam 610, 620, 630 or to the diversity component 510, 520, 530. The phase factor $\Phi_{m,k}$ can be an absolute angle or a phase transition in relation to a phase angle of the reference antenna element. Symbol i is an imaginary unit and e is the Neper figure. The weighting coefficients $W_{m,k}$ are often selected so that orthogonal vectors, by means of which radiation patterns orthogonal to one another can be achieved, are formed in the matrix V. Orthogonal radiation patterns ensure as small correlation as possible between the radiation patterns, and thus improve the quality of transmission and reception in beam forming because the interference between the main beams 610, 620, 630 is minimized. When antenna diversity is utilized, the data transmission mode of the base station 142, 144, 152, 154 is called antenna diversity mode. In the antenna diversity mode, at least two antenna elements 262, 264 that are as far apart from each other as possible are used in reception and/or transmission of a signal. Even though in the present solution antenna diversity is viewed from the point of view of the base station 142, 144, 152, 154, the teachings of the solution can also be applied to transmission and/or reception by terminals.

Multi-path diversity can be generated in an environment where it does not naturally exist using transmitting antenna diversity, i.e. TX diversity. Fading of channels and shadow regions of cells can be reduced by multi-path diversity. Transmission diversity can be roughly divided into two different operation modes, i.e. an open-loop mode and a closed-loop mode.

In the open-loop mode, data transmission between the base station 142, 144, 152, 154 and the user terminal 170 is performed using space-time coding, which does not require transmission of channel state information from the user terminal 170 to the base station 142, 144, 152, 154.

In the closed-loop mode, the user terminal 170 transmits channel state information on the downlink to the base station 142, 144, 152, 154 to optimize the transmission by the diversity antenna. Using the state information, the base station 142, 144, 152, 154 determines antenna weights 212A, 214A, 212B, 214B of each antenna branch 216A, 216B so that the transmission weighted with them is optimal for the recipient and possibly in respect of the total capacity of the radio system, too. The channel state information can be transmitted using uplink control channels, such as the DPCCH (Dedicated Physical Control Channel). In practice, the closed-loop mode is applied to transmission of user-specific channels.

The receiver-antenna diversity is mainly utilized in the base stations 142, 144, 152, 154 and it allows reception of the energy included in the receiving signal with a better efficiency. The receiver-antenna diversity can further be divided into polarization diversity and space diversity. In the case of receiver diversity, the base station 142, 144, 152, 154 can optimize its reception by modifying the antenna weights 212A, 214A, 212B, 214B of the antenna branches 216A, 216B.

In polarization diversity, at least two receiving antennas 262, 264 are provided with different polarizations, in which case they can received signals polarized differently by the radio transmission path.

In space diversity, signals are received and/or transmitted by at least two antenna elements 262, 264 which are physically apart from each other and which both separately receive or form multi-path components of the signal to be transmitted. Also the following solution is feasible: each above-mentioned antenna element 262, 264 is replaced with one phased antenna array, which includes at least two antenna elements.

The advantages achieved with antenna diversity usually increases as the distance between the antenna elements 262, 264 becomes longer. In that case the distance between at least two antenna elements which form antenna diversity is at least in the order of the wavelength of the carrier wave used by the base station 142, 144, 152, 154. FIG. 3 illustrates, as one feature of the invention, a compact antenna array 340 for implementing the radio interface of the base station 142, 144, 152, 154. The antenna array 340 comprises a linear part 310 and a non-linear part 320. The linear part 310 comprises at least two antenna elements 312, 314 for transmitting and receiving signals. The non-linear part 320 comprises at least one antenna element 322 for transmitting and receiving signals.

The linear part 310 is arranged to provide a beam radiation pattern 600 for example by arranging the antenna elements 312, 314 into a linear antenna array (ULA, Uniform Linear Antenna Array). In that case, the phase difference between the antenna elements 312, 314 is linearly dependent on their location in the antenna array 340. Beam forming and beam controlling require sufficiently frequent spatial sampling from an electromagnetic wave front, which can be implemented by arranging the antenna elements 312, 314 sufficiently close to each other. In an embodiment, the distance 316 between the adjacent antenna elements 312, 314 of the linear part 310 corresponds approximately to half of the wavelength of the carrier wave used by the radio interface.

In an embodiment, the linear part 310 is arranged to form at least one component 510, 520, 530 of the diversity radiation pattern 500. In the diversity mode it is advantageous to use antenna elements 312, 314 of the linear part 310 between which correlation is as low as possible. A sufficiently low correlation is achieved e.g. by using antenna elements 312, 314 whose distance from each other is at least in the order of the wavelength of the carrier wave used by the radio interface 168.

The present solution is not limited to typical linear antenna arrays but any distance between the antenna elements is acceptable, provided that beam forming can be influenced by phasing the antenna elements.

The non-linear part 320 of the antenna array 340 comprises at least one antenna element 322. The non-linear part 320 is arranged to form at least one component of the diversity radiation pattern 500. It is advantageous to keep the minimum distance 324 between the non-linear part 320 of the antenna element 322 and the linear part 310 of the antenna element 312, 314 in the order of the wavelength of the carrier wave used by the radio interface. For example, at a frequency of 2 GHz the distance would be approximately 15 cm.

In an embodiment, the non-linear part 320 is arranged to enlarge the aperture of the antenna array 340 in the beam-forming mode. The aperture can be enlarged by weighting an antenna element 322 of the non-linear part 320 with the weighting coefficients used in beam forming.

The antenna solution described allows formation of a deterministic radiation pattern, in which case the desired operation mode, i.e. either the diversity mode or the beam-forming mode, can be implemented by predetermined weights. It is advantageous to place the antenna elements 312, 314, 322 of the antenna array 340 in the same plane and same line with a predetermined accuracy. The same plane is e.g. the plane illustrated in FIG. 3 and the line is the line formed by the antenna elements 312, 314, 322 shown in FIG. 3. The line may be horizontal or vertical with respect to the earth's horizon.

In an embodiment, two or more antenna elements are utilized in the diversity mode and all antenna elements of the antenna array 340 are utilized in the beam-forming mode. The reason for this is that the pre-determined, accurate geometric positioning of the antenna elements also enables utilization of antenna elements of the non-linear part 320 in the beam-forming mode, provided that complex weighting of the antenna elements is selected carefully. In addition to enlargement of the antenna aperture, the accurate geometry of the antenna elements enables optimization of the beam pattern so that the directional error and side lobe level of the beams can be minimized, for instance.

In an embodiment, the antenna array 340 comprises a matrix structure consisting of antenna elements 312, 314, 322 of more than one linear part 310 and more than one non-linear part 320. The matrix structure is not shown in FIG. 3 but a person skilled in the art can construct it easily by placing structures according to the antenna array one on top of another in the plane of FIG. 3. In that case, the matrix may consist of 4 columns and 6 to 12 rows and the height of the matrix antenna array may vary from 80 cm to 250, for instance. The matrix-structured antenna array can also be configured so that at least two rows of the matrix structure have different polarization directions. In an embodiment, odd antenna rows have a certain polarization direction and even ones have a different polarization direction. The difference between the polarization directions may be 90 degrees, for example.

The present compact antenna array solution enables a small-sized antenna array for implementing both the beam-forming mode and the antenna diversity mode. The compact antenna array 340 constitutes a uniform structure where antenna elements 312, 314, 322 are included already during the manufacturing process of the antenna array 340 with a pre-determined accuracy of positioning. Furthermore, the antenna elements 312, 314, 322 can be put in the same radome. The positioning accuracy of the antenna elements 312, 314, 322 may vary from a hundredth of the wavelength of the carrier wave to tenths of it, depending on the number of the antenna elements 312, 314, 322 in the antenna array 340 and on the number, width and dynamic range of the beams 610, 620, 630 to be formed as well as on the length of the carrier wave used.

Thanks to the uniform structure, the compact antenna array 340 is easy to move and assemble since the positions of the antenna elements 312, 314, 322 with respect to one another do not change in the compact antenna array 340. Thanks to the pre-determined positioning accuracy, the antenna geometry of the antenna array 340 is fixed and does not depend on the assembly of the antenna, for instance. In that case the antenna array 340 itself does not require calibration, and an external phase array, a calibrated phase array or a beam forming matrix can be easily connected to it to provide the desired fixed beam radiation pattern 600.

The fixed antenna geometry allows the use of pre-determined antenna weights in the formation of the beam-forming mode, in which case the resulting beam radiation pattern 600 will be within the pre-determined error limits and does not require field measurements and physical adjustment of the antenna elements 312, 314, 322. Furthermore, the solution enables optimization of the beam radiation pattern 600 using calibration procedures of the compact antenna array 340. During the manufacturing process of the antenna array 340, the alignment of the antenna elements 312, 314, 322 can be determined as the same within the limits of the pre-determined accuracy. For example, when prior art microscopic patch antenna elements are used, the antenna elements 312, 314, 322 can be placed on the same back plate, which ensures that the antenna elements 312, 314, 322 have the same alignment with a sufficient accuracy. In addition, the properties between the antenna elements 312, 314, 322 are similar.

The width and height of a typical antenna element 312, 314, 322 correspond approximately to half of the carrier wave used. When the carrier wave frequency is 2 GHz, the width of a compact antenna array 340 is typically 30 to 80 cm, depending on the number of antenna elements 312, 314, 322, and the height 60 to 250 cm, depending on the number of antenna lines on top of one another. At its smallest the width of the antenna array 340 of 2 GHz is thus about 30 cm if it consists of two antenna elements 312, 314 of the linear part 310 and one antenna element 322 of the non-linear part 320 and if the distance between the linear part 310 and the non-linear part 320 is 1 wavelength, i.e. 15 cm. Correspondingly, the narrowest 4-element antenna array 340 of 2 GHz is approximately 37.5 cm wide. The antenna elements 312, 314, 322 may be antenna solutions known per se, such as dipole or patch antennas, and the compact antenna array 340 can be produced using techniques that are known by experience to be good.

Referring to FIGS. 2 and 3, the signals of the antenna elements 312, 314, 322 in the antenna array 340 shown in FIG. 3 can be weighted in accordance with FIG. 2. Each antenna element 312, 314, 322 has a separate antenna branch 216A, 216B and complex multipliers 222A, 224A, 222B, 224B.

In the solution described, the base station 142, 144, 152, 154 of the radio system comprises a compact antenna array 340 for implementing the radio interface 162 of the base station 142, 144, 152, 154. Furthermore, the base station 142, 144, 152, 154 comprises the weighting means 222A, 224A, 222B, 224B shown in FIG. 2 for weighting signals of the antenna elements 312, 314. In the solution described, the linear part 310, non-linear part 320 and weighting means 222A, 224A, 222B, 224B of the antenna array 340 are arranged to form the beam-forming mode of the base station 142, 144, 152, 154. In the beam-forming mode, beam radiation patterns formed by weighting signals of the transceiver 202A, 202B e.g. in the manner described above are used in the data transmission between the base station 142, 144, 152, 154 and the user terminal 170. In the solution described, the linear part 310, non-linear part 320 and weighting means 222A, 224A, 222B, 224B are arranged to form the antenna diversity mode of the base station 142, 144, 152, 154.

In the present solution, the antenna diversity mode is formed in the base station 142, 144, 152, 154 using at least one antenna element 312, 314 of the non-linear part 310 of the compact antenna array 340 and at least one antenna element 322 of the non-linear part 320. The beam-forming mode is formed in the same base station 142, 144, 152, 154 using the same antenna array 340 and at least one antenna element 312 of the linear part 310 used in the formation of the antenna diversity mode and another antenna element 314 of the linear part 310. In addition, the antenna elements 322 of the non-linear part 320 can be used in beam forming. Thus the present solution enables both the beam forming mode and the antenna diversity mode using the same antenna array 340.

In an embodiment, a;transition is performed between the antenna diversity mode and the beam-forming mode. The transition can be carried out in either direction. In that case, each mode is implemented by mode-specific antenna weights 212A, 214A, 212B, 214B, which form the configuration of the antenna elements 312, 314, 322 in each mode. For example, in the antenna diversity mode, some antenna elements 312, 314, 322 may be weighted with a zero weight, in which case the antenna element 312, 314, 322 weighted with the zero weight does not participate in the formation of the mode in question.

In an embodiment, the above-mentioned transition is performed according to the current capacity requirement of the radio system. For example, a transition may be performed from the diversity mode to the beam-forming mode as the capacity requirement increases. The transition can also be carried out as a one-time performance when the development of radio systems requires beam forming, for example. In that case the present antenna solution enables a transition with very few measures. The transition from the beamforming mode to the diversity mode can be performed e.g. in a fault situation when the beam forming is interrupted for some reason. In that case, a rapid transition to the diversity mode enables continuous operation of the radio system.

As illustrated in FIG. 2, the antenna diversity mode can be formed using antenna elements 312 and 322, in which case the antenna element 314 of the linear part 310 closest to the non-linear part 320 is weighted with the zero weight. It is also feasible that the antenna diversity mode is formed using the antenna element 314 of the linear part 310 closest to the non-linear part 320 and at least one antenna element 322 of the non-linear part 320, but in this case the distance between the antenna elements 314, 322 has to be sufficient for the condition for antenna diversity to be fulfilled. In an embodiment, the antenna diversity mode is formed using at least one antenna element 322 of the non-linear part 320 whose minimum distance 324 to the antenna element 310 of the linear part 310 is in the order of the wavelength of the carrier wave used by the base station 142, 144, 152, 154. When the carrier frequency is 2 GHz, for example, the minimum distance is 15 cm. In an extreme case, all the antenna elements can be used both in the diversity mode and in the beam forming mode.

Furthermore, the antenna configuration used in the beam-forming mode will be described with reference to FIG. 2. At least two adjacent antenna elements 312, 314 phased with respect to each other are used in the beam-forming mode. In an embodiment, the beam-forming mode is formed using also at least one antenna element of the non-linear part 320 of the antenna array 340, which enlarges the aperture of the antenna array 340. In that case, the beam radiation pattern 600 formed by the antenna array 340 narrows and the signal power of the base station 142, 144, 152, 154 is allocated more efficiently to the desired area of the cell.

In an embodiment, the antenna elements 312, 314 and 322 of the antenna array 340 have the same polarization. In another embodiment, the antenna diversity mode is formed using at least one antenna element 322 of the non-linear part 320 which is provided with a different polarization than at least one antenna element 314, 322 of the linear part 310. In diversity reception, in particular, the antenna element 322 with a different polarization produces polarization variations of reception, thus improving the probability of signal power in reception. Polarization can be realized with polarizing antenna elements 312, 314, 322, which are known to a person skilled in the art. It is also feasible to use a solution where the same antenna array includes antenna elements arranged in two different ways, e.g. using a polarization difference of 90 degrees, and grouped appropriately.

A compact antenna array 400 according to the present solution will be described with reference to FIG. 4. The antenna array 400 comprises a linear part 410, which includes antenna elements 412, 414, 416, 418, 420, 422. The antenna array 400 further comprises a non-linear part 440, which includes antenna elements 442 and 444. The distance 426 between the antenna elements 420, 422 in the linear part 410 corresponds to the distance 316 shown in FIG. 3 and the distance 424 between the linear part 420 and the nonlinear part 440 corresponds to the distance 324 shown in FIG. 3. Furthermore, the distance 446 between the antenna elements 442, 444 in the nonlinear part 440 is shown. In an embodiment, the distance 446 between the antenna elements 442, 444 in the non-linear part 440 approximately corresponds to or is longer than the wavelength of the carrier wave used. Weighting of the antenna array 400 signal can be implemented as shown in FIG. 2 by providing an antenna branch 216A, 216B for each antenna element 412, 414, 416, 418, 420, 422, 444. The horizontal axis 450 shown in FIG. 4 represents the coupling between the antenna elements 412, 414, 416, 418, 420, 422 and 444. The coupling may consist of a location, for example, in which case the unit on the horizontal axis 450 can be a unit of length. In that case, the distance 452 between the lines on the horizontal axis 450 approximately corresponds to half of the wavelength of the carrier wave used, for example. The coupling can also be illustrated by means of polarization, in which case the horizontal axis 450 shows the polarization angle between the antenna elements 412, 414, 416, 418, 420, 422 and 444. In that case, the polarization angle changes along the horizontal axis 450: the polarization difference between the outermost antenna elements 412, 444 is the greatest.

In an embodiment, the antenna diversity mode is formed using the antenna elements 412, 414, 416, 418, 420, 422 of the same parity of the linear part 410 in the antenna array 400. In that case, every second antenna element 412, 414, 416, 418, 420, 422 is used in the antenna diversity mode, and thus no coupling is formed between the adjacent antenna elements 412, 414, 416, 418, 420, 422. For example, an antenna diversity mode where antenna elements 412, 416, 420, 422, 442 and 444 of the antenna array are used is feasible. The distance between the antenna elements used in the linear part 410 is in the order of the length of the carrier wave. In another embodiment, the distance between the antenna elements used in the antenna diversity mode is approximately twice the length of the carrier wave. In that case antenna elements 412, 420, 442 and 444 are used in the antenna diversity mode.

In an embodiment, the beam-forming mode is formed by weighting signals of antenna elements 312, 314, 322 of the antenna array with predetermined weights 212A, 214A, 212B, 214B. In that case the transition from the antenna diversity mode to the beam-forming mode can be performed without determining the weights 212A, 214A, 212B, 214B during the transition, and thus the transition can be performed very fast. The pre-determined weights 212A, 214A, 212B, 214B can be formed e.g. by simulating them with specific simulation tools, such as computer software, or by performing field measurements in the cell of the base station 142, 144, 152, 154. The pre-determined weights can be stored in the memory means of the control unit 210 in the base station 142, 144, 152, 154, for instance. From the memory means, the weights are loaded to the complex multipliers 222A, 224A, 222B, 224B. The weights can be presented by a weight matrix V, for example.

In an embodiment, there are several weight matrixes, from which a suitable one is selected according to the capacity requirement of the base station, 142, 144, 152, 154, for example. In that case some of the antenna elements 412, 414, 416, 418, 420, 422, 442 and 444 may function in the diversity mode and others in the beam-forming mode.

In an embodiment, the beam-forming mode is formed by weighting signals of the antenna elements 312, 314, 322 in the antenna array 340 to produce a user-specific radiation pattern adapted to the radio environment. This is known as adaptive beam forming where the base station 142, 144, 152, 154 determines weights 212A, 214A, 212B, 214B advantageous in respect of the user terminal 170. The weights can be determined by means of the channel estimation performed by the user terminal 170. In that case the user terminal 170 performs channel estimation and transmits information about the channel estimate on uplink control channels to the base station 142, 144, 152, 154, which adapts its transmission weights on the basis of the information it has received. In another embodiment, the base station 142, 144, 152, 154 receives a signal from the user terminal 170, analyzes it and adapts its transmission and/or reception according to the analysis. This analysis is based on the channel and direction estimation according to the prior art and may also be carried out in co-operation of the base station 142, 144, 152, 154 and the radio network controller 146. FIGS. 7 and 8 describe the effect of the non-linear part 320 on beam forming. In FIGS. 7 and 8 the horizontal axis 760, 860 represents an azimuth angle determined from the antenna array 260 of the base station 142, 144, 152, 154, and the vertical axis 750, 850 represents the signal power of the radiation patterns 700, 800 shown in the figures. A six-element antenna array 340 is used in both of the radiation patterns 700, 800 illustrated in FIGS. 7 and 8. The beam structure 700 of FIG. 7 has been formed using a 6-element linear antenna array without the non-linear part 320. The radiation pattern of FIG. 8 has been formed using a 5-element linear part 310 and single-element non-linear part 320. The distance 324 of the antenna element 322 in the non-linear part 320 is about two carrier wave wavelengths of the distance in the linear part 310.

FIG. 7 illustrates two main beams 720, 730 of a grid of fixed beams 700. Main beam 730 is the middle main beam parallel with the broad side of the antenna array, and main beam 720 is the main beam directed towards the sector edge. In addition, the figure shows side beams 722, 724 and 726 related to the main beam 730 directed to the edge and side beams 732, 734 related to the middle main beam 730.

FIG. 8 illustrates two main beams 820, 830 of a grid of fixed beams 800. Main beam 830 is the middle main beam and main beam 820 is the main beam directed towards the sector edge. The quality of the beams is determined by the beam power and the side lobe structure. The side lobe structure related to the main beams 820, 830 can be found out by following the curves presenting the main beams 820, 830.

The following phase transitions were used in forming the beam structures:

| antenna | Beam 720 | Beam 730 | Beam 820 | Beam 830 |
|---|---|---|---|---|
| 1 | 0 | 0 | 0 | 0 |
| 2 | 150 | 0 | −150 | 0 |
| 3 | 300 | 0 | −264 | 0 |
| 4 | 450 | 0 | −373 | 0 |
| 5 | 600 | 0 | −530 | 0 |
| 6 | 750 | 0 | −594 | 0 |

By comparing the beam structures 700 and 800, it is found that the use of the non-linear part 320 narrows the middle main beam 830 and increases the power of the main beam 820 directed towards the edge. In addition, the level of side lobe structures remained low.

The present solution will now be described by the method flow chart illustrated in FIG. 9. In the starting block 910 of the chart the base station 142, 144, 152, 154 may be in any state where either an antenna diversity mode or a beam-forming mode can be formed. An antenna diversity mode is formed in block 820 according to the present solution. In block 930, weighting coefficients are loaded according to an embodiment to form the next mode. A beam-forming mode is formed in block 940 according to the present solution. The order in which blocks 920 and 930 are performed can also be changed so that block 930 is performed before block 920. In block 950, a transition is performed between the modes according to an embodiment: a transition from the mode formed first to the mode formed second. The method ends in block 960 and the base station 142, 144, 152, 154 continues to operate in the mode formed last.

Even though the invention has been described above with reference to an example according to the accompanying drawings, it is clear that the invention is not limited thereto but it may be modified in various ways within the scope of the appended claims.

The invention claimed is:

1. A data transmission method in a base station of a radio system, the method comprising performing the following steps in the same base station:
forming an antenna diversity mode using at least one antenna element of a linear part of a compact antenna array and at least one antenna element of a non-linear part;
performing a transition between a beam-forming mode and the antenna diversity mode of the base station by selecting a suitable weight matrix from several weight matrices according to the capacity requirement of the base station, and
forming the beam-forming mode using at least one antenna element of the linear part of the compact antenna array used in the formation of the antenna diversity mode and another antenna element of the linear part and by weighting the antenna elements with the suitable weight matrix.

2. A method according to claim 1, wherein the beam-forming mode is formed using also at least one antenna element of the non-linear part of the compact antenna array.

3. A method according to claim 1, wherein the minimum distance of the antenna element of the non-linear part in the compact antenna array from the antenna element of the linear part is in the order of the wavelength of the carrier wave used by the base station.

4. A method according to claim 1, wherein the antenna diversity mode is formed using at least one antenna element of the non-linear part which is provided with different polarization that at least one antenna element of the linear part.

5. A base station of a radio system, comprising:
a compact antenna array for implementing a radio interface of the base station;
the compact antenna array including a linear part and a non-linear part;
the linear part including at least two antenna elements for transmitting and receiving signals;
the non-linear part including at least one antenna element for transmitting and receiving signals;
weighting means for weighting signals of the antenna elements;
the linear part, non-linear part and weighting means being arranged to form a beam-forming mode of the base station with pre-determined weight matrix;
the linear part, non-linear part and weighting means being further arranged to form a diversity mode of the base station, and
wherein the weighting means are arranged to perform a transition from the antenna diversity mode to the beam-forming mode of the base station by selecting a suitable weight matrix from several weight matrices according to the capacity requirement of the base station.

6. A base station according to claim 5, wherein the base station comprises memory means for storing pre-determined weights of the antenna elements;
the weighting means are arranged to load the pre-determined weights from the memory means; and
the weighting means are arranged to weight signals of the antenna elements of the antenna array with said weights.

7. A base station according to claim 5, wherein the linear part is also arranged to form at least one component of the diversity radiation pattern.

8. A base station according to claim 5, wherein the linear part and the non-linear part are in the same radome.

9. A base station according to claim 5, wherein the non-linear part is arranged to enlarge the aperture of the antenna array in the beam-forming mode.

10. A base station according to claim 5, wherein the minimum distance between the antenna element of the non-linear part and the antenna element of the linear part is in the order of the wavelength of the carrier wave used by the radio interface.

11. A base station according to claim 5, wherein the distance between adjacent antenna elements in the linear part corresponds approximately to half of the wavelength of the carrier wave used by the radio interface.

12. A base station according to claim 5, wherein the antenna elements are arranged in the same plane and same line with a pre-determined accuracy.

13. A base station according to claim 5, wherein the non-linear part and the linear part are arranged horizontally in the same line.

14. A base station according to claim 5, wherein several linear parts and several non-linear parts form a matrix structure.

15. A base station according to claim 5, wherein at least one antenna element of the non-linear part is provided with a different polarization than at least one antenna element of the linear part.

* * * * *